Figure 6:
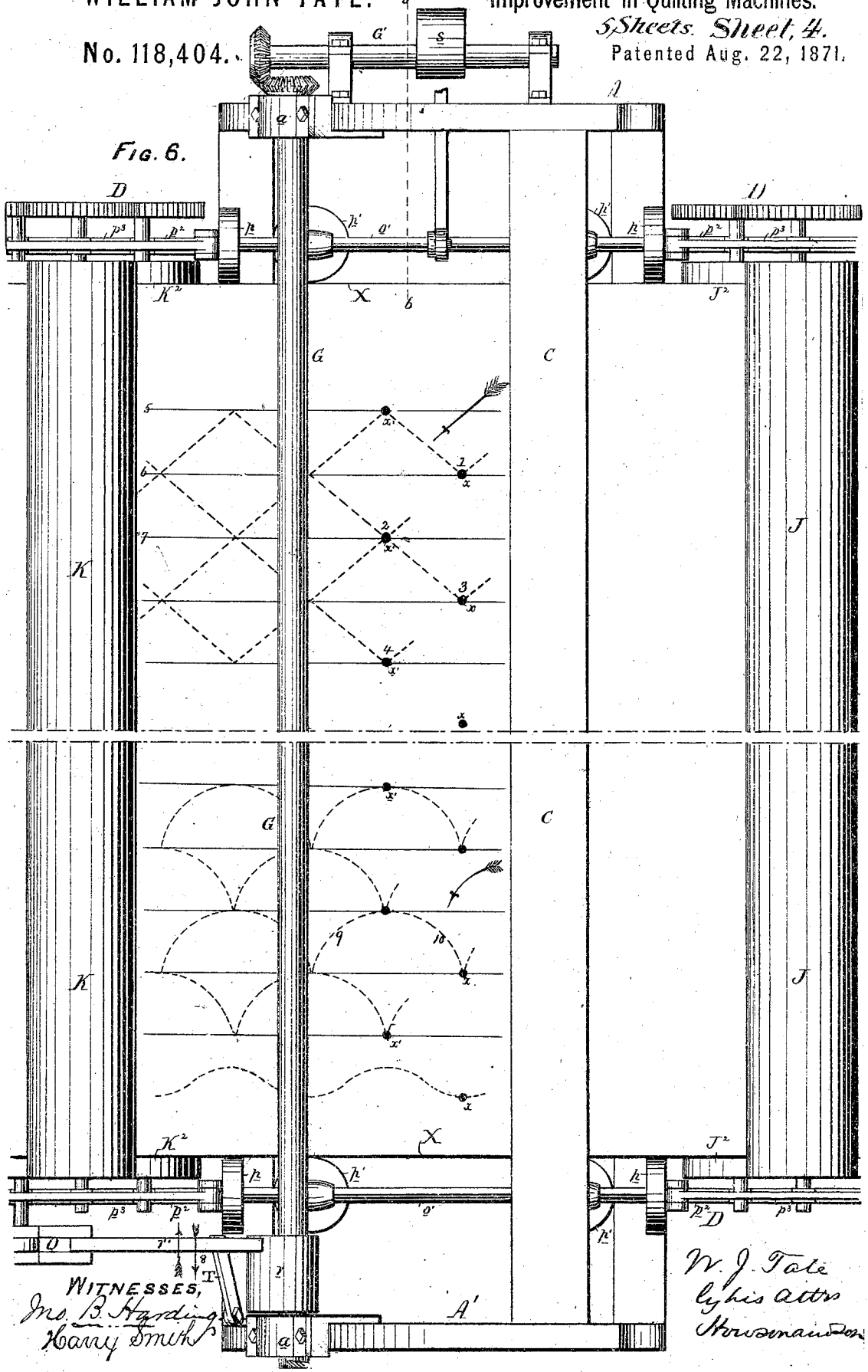

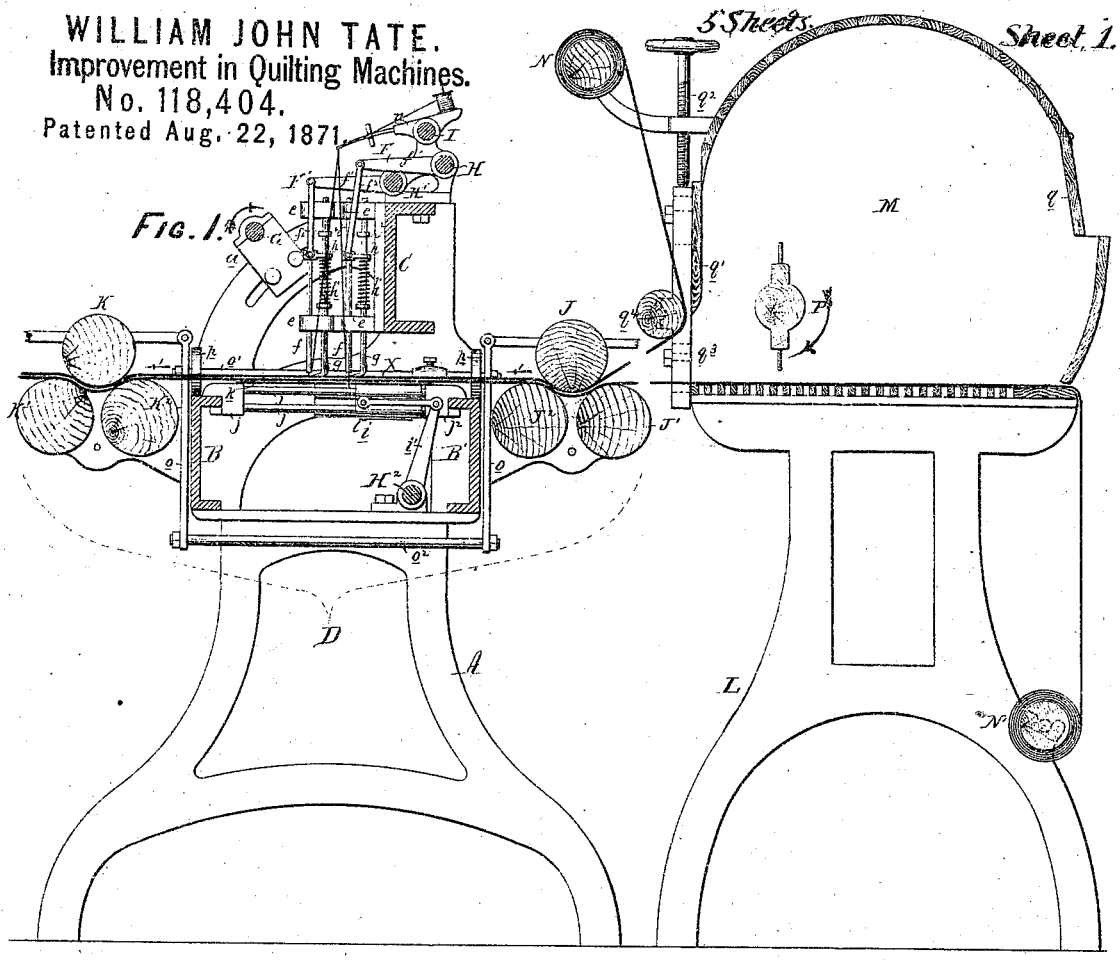
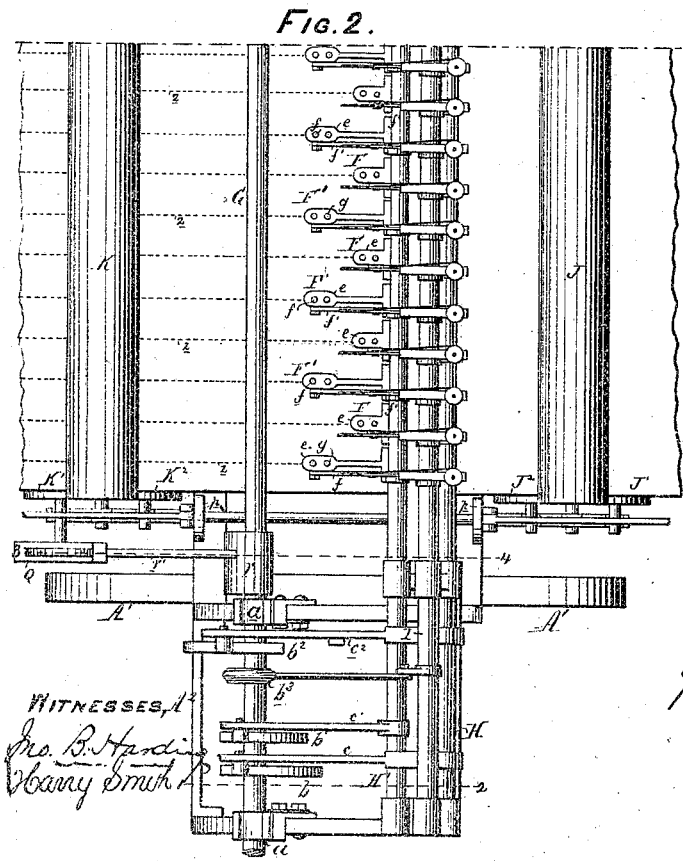
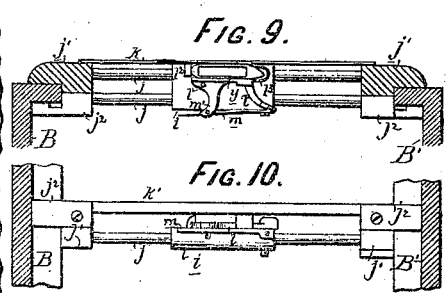
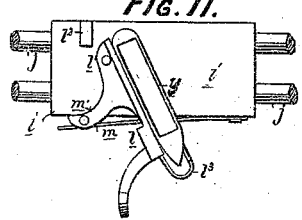

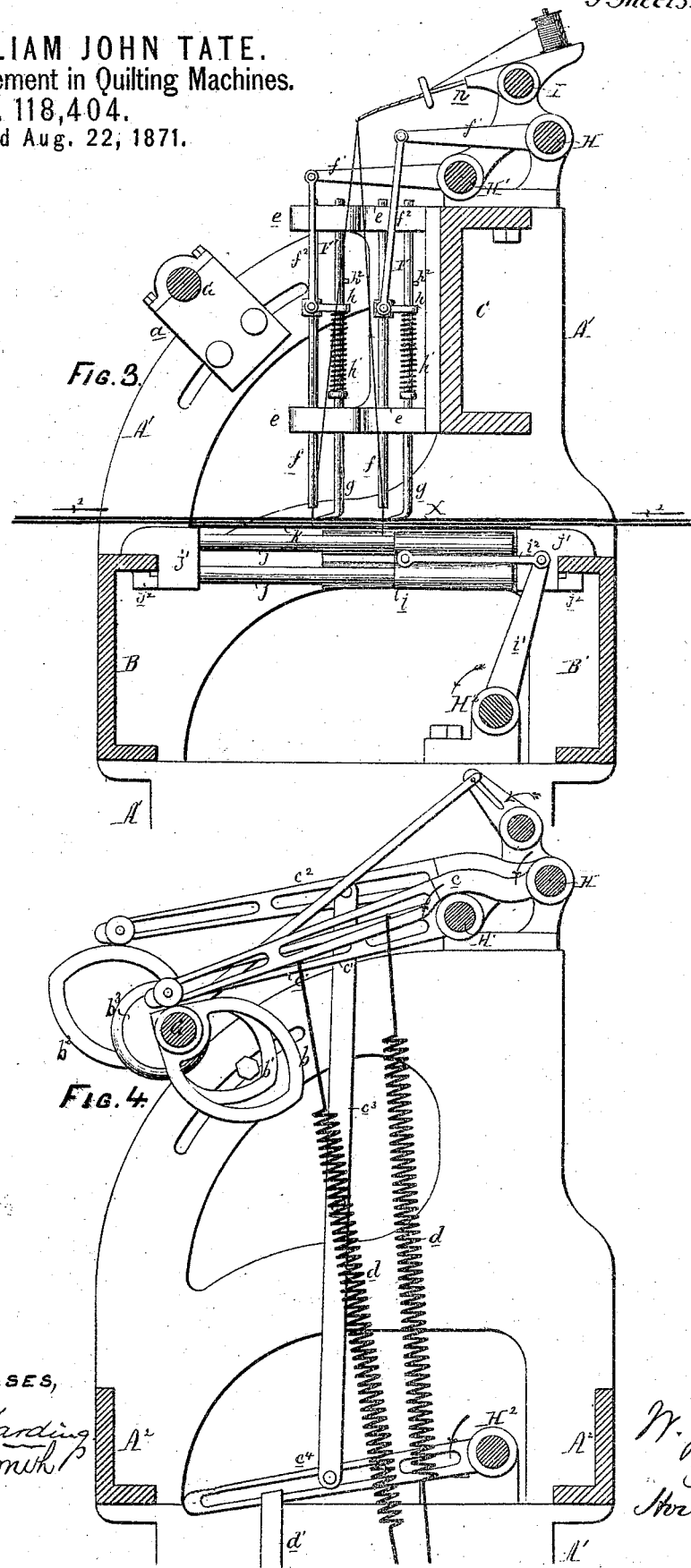

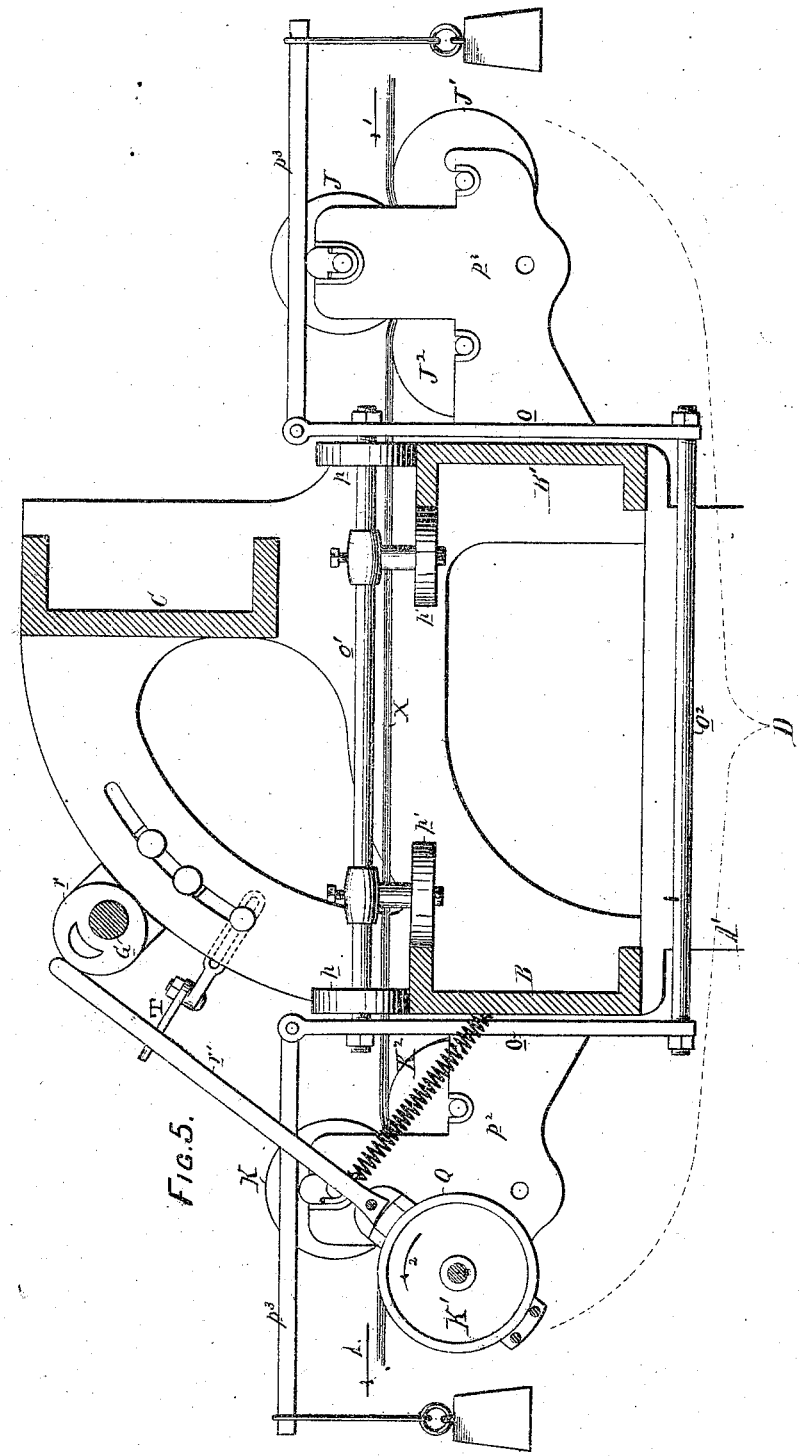

WILLIAM JOHN TATE.
Improvement in Quilting Machines.
No. 118,404.
Patented Aug. 22, 1871.

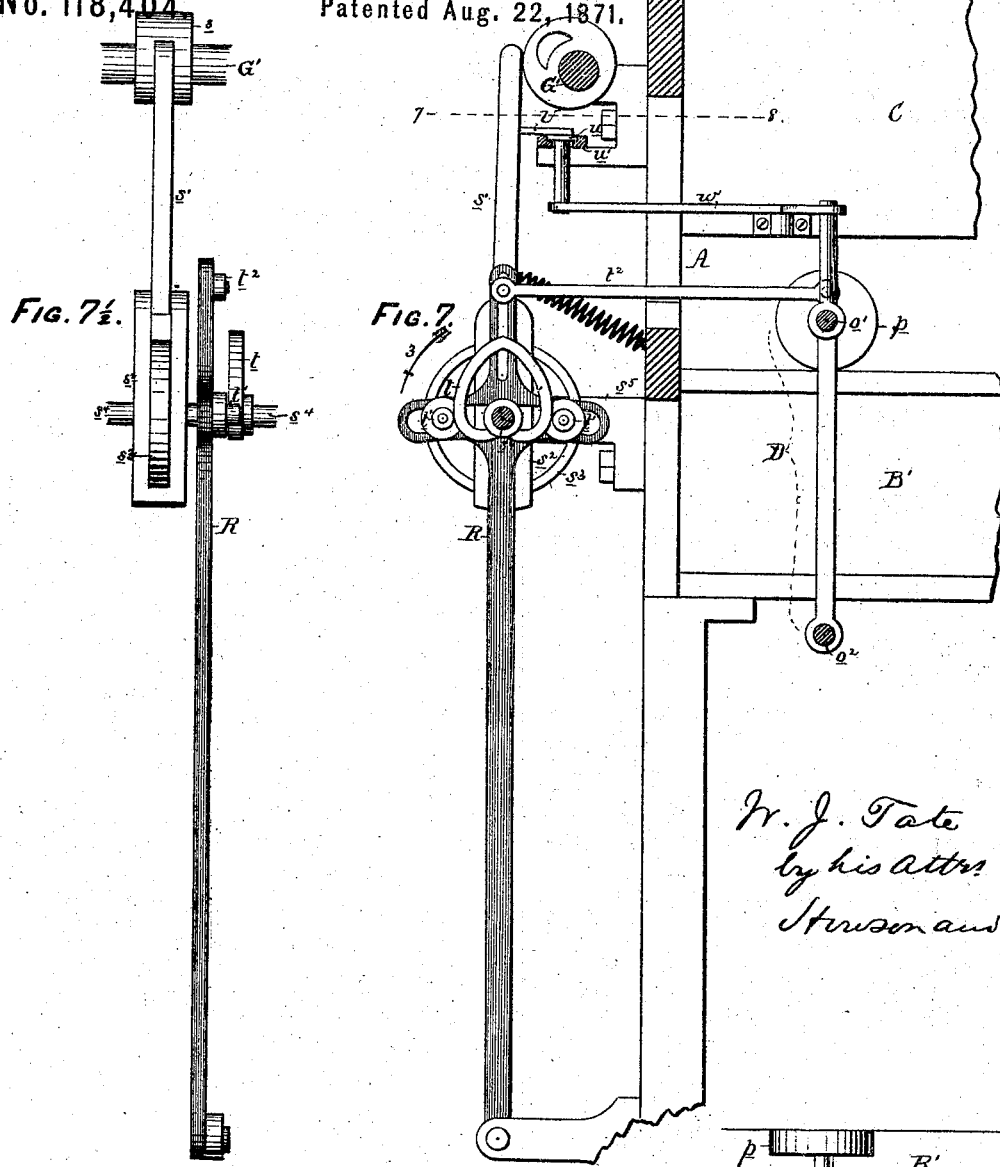
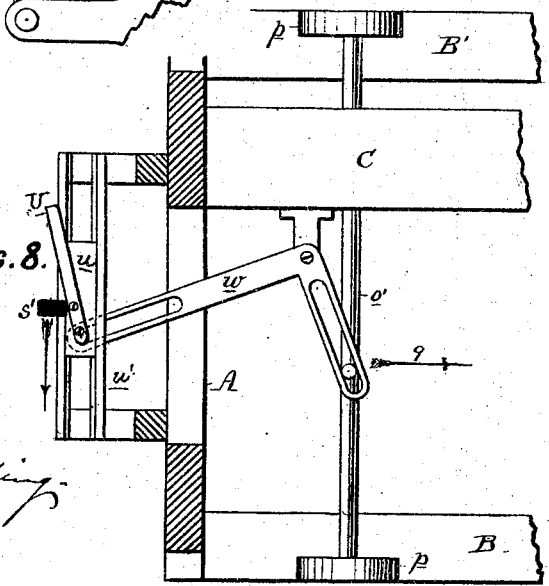

118,404

UNITED STATES PATENT OFFICE.

WILLIAM JOHN TATE, OF PHILADELPHIA, PENNSYLVANIA.

IMPROVEMENT IN QUILTING-MACHINES.

Specification forming part of Letters Patent No. 118,404, dated August 22, 1871.

*To all whom it may concern:*

Be it known that I, WILLIAM JOHN TATE, of Philadelphia, county of Philadelphia, State of Pennsylvania, have invented an Improved Quilting-Machine, of which the following is a specification:

My invention consists of certain improvements in quilting-machines, too fully described hereafter to need preliminary explanation.

Figure 1, Sheet 1, is a vertical sectional view of my improved quilting-machine; Fig. 2, Sheet 1, a plan view of one end of the same; Fig. 3, Sheet 2, an enlarged view of part of Fig. 1; Fig. 4, Sheet 2, a section on the line 1 2, Fig. 2, drawn to an enlarged scale; Fig. 5, Sheet 3, a section on the line 3 4, Fig. 2, also enlarged; Fig. 6, Sheet 4, an enlarged plan view of the frame of the machine and its traversing-carriage; Fig. 7, Sheet 5, a vertical section of part of the machine on the line 5 6, Fig. 6; Fig. 7½, Sheet 5, an edge view of Fig. 7; Fig. 8, Sheet 5, a sectional plan on the line 7 8, Fig. 7; and Figs. 9, 10, and 11, Sheet 1, detached views of one of the shuttles and its carrier.

The end frames A $A^1$ of the machine proper are connected together by three flanged bars, B, B', and C, Figs. 1, 3, and 5, the two former of which are directly opposite each other and serve as ways for a traversing-carriage, D, more particularly referred to hereafter, and also as a support for the work-plates and shuttle-supporters of a number of sewing-machines, F F', of which there are as many as it is desired to form rows of stitches on the quilt, Figs. 2 and 3. The main driving-shaft G of the machine turns in suitable bearings $a\ a\ a$ of the end frames, and is provided at one end with a suitable driving-pulley or pulleys. On the driving-shaft, adjacent to one end of the same and within an extension, $A^2$, of the end frame $A^1$, are three cams, $b$, $b^1$, and $b^2$, and an eccentric, $b^3$. (See Figs. 2 and 4.) The cams $b$ and $b^1$ lift two arms, $c$ and $c^1$, secured to rock-shafts H and $H^1$, and thus partially rotate the latter; and the cam $b^2$ similarly lifts an arm, $c^2$, which turns loosely upon the rock-shaft H, and is connected by a rod, $c^3$, to an arm, $c^4$, of a rock-shaft, $H^2$, the latter having the required motion in one direction imparted to it from the cam $b^2$ through the medium of these devices. The arms $c$, $c^1$, and $c^2$ are held down to the operating-cams and the rock-shafts are turned in the directions of their respective arrows, Fig. 4, by means of strong spiral springs $d\ d$, connected at one end to the arms $c$ and $c^1$ and at their opposite ends to a strap, $d'$, which, after passing downward and around a pulley, is fastened to the arm $c^4$ of the rock-shaft $H^2$. The required movements are imparted to the needles and shuttles of the sewing-machines by the rock-shafts H, $H^1$, and $H^2$, as will presently appear; and these shafts receive their forward-propelling movement from the springs $d\ d$, and not from the cams, which merely effect the return movement, the object of which arrangement will be hereafter described. Each sewing-machine F and F' has a frame, $e$, so bolted or otherwise secured to the bar C that it can be adjusted upon the latter from or toward the other machines. The frames of the machines F' project outward from the bar to a greater extent than those of the machines F, and are alternated with the latter, as best observed in Fig. 2, the machines being, in other words, so arranged in two parallel rows that the needles of one set of machines may penetrate the work at a greater distance outward from the bar C than those of the other set. This will be readily understood on referring to Fig. 6, where the row of dots $x\ x\ x$, &c., represents the needles of the machines F, and the dots $x\ x'$, &c., those of the machines F'. Each sewing-machine has a vertical needle-bar, $f$, and presser-bar $g$ sliding in the frame $e$. The needle-bars of the machines F are operated by arms $f^1$ projecting from the rock-shaft H and connected to the said bars by rods $f^2$, and the needle-bars of the machines F' are operated in a similar manner from the rock-shaft $H^1$, the said rock-shafts being so timed in their movements that they shall operate all of the machines of both rows simultaneously. (See Fig. 3.) The presser-bars, instead of being held down continuously upon the work, as usual, are pressed down upon the same, on the descent of the needle-bars, by arms $h$ of the latter, which are forced against spiral springs $h^1$ on the said presser-bars. When the needle-bars are raised the pressure of the springs is relieved, and the presser-bars are lifted bodily from the work by the arms $h^1$, which strike lugs $h^2$ on the said bars. With this arrangement the work can be fed forward without that undue resistance which would be offered by the whole number of presser-bars if they were held down continuously. The sliding shuttle-carriers $i$, Fig.

3, are operated simultaneously and in proper time to carry the shuttles $y$ through the loops of needle-thread by arms $i^1$ of the rock-shaft $H^2$, which are connected to the said carriers by rods $i^2$. Each shuttle-carrier has two holes extending entirely through it for the passage of the two horizontal guiding-rods $j$, upon which the carrier is arranged to slide, the said rods being secured at their opposite ends to blocks $j^1$ and $j^2$, Figs. 3, 9, and 10, which are clamped together and to the flanged bars B and B' of the fixed frame by set-screws or otherwise. These clamping-blocks, and with them the shuttle-carriers and shuttles, can be adjusted from or toward each other upon the bars B and B'. As the frames $e$, carrying the needle-bars and pressers, are also adjustable in the same manner from or toward each other upon the bar C, it will be readily seen that the rows of stitches formed by the machines upon the quilts can be made at any desired distances apart. A work-plate, $k$, for each sewing-machine is secured to the upper edges of the opposite blocks $j^1$, and to one side of the said blocks is secured a plate, $k'$, between which and the carrier the shuttle is held laterally, Figs. 9 and 10. The shuttle is held in a proper position vertically by a bent lever, $l$, Fig. 11, hung to the carrier at the point $l^1$, and it is held longitudinally by a lug, $l^2$, on the carrier and by a hook, $l^3$, on the said lever $l$, which passes partly around the nose of the shuttle. The lever $l$ is held in either of the two positions shown in Figs. 9 and 11 by a spring, $m$, secured to the carrier and bearing against its arm $m'$; and when the said lever is turned downward, as shown in Fig. 11, the shuttle can be readily removed from beneath the machine and as readily replaced by another. This is an important feature, and will be more particularly referred to hereafter. Each sewing-machine is provided with a tension device, consisting of a lever, $n$, hung to a rock-shaft, I, which derives it motion from the eccentric $b^3$ (before referred to) on the driving-shaft G. The spool is hung to the lever $n$, and the latter operates, in conjunction with the needle-bar, as hereinafter described, so as to give and take up the slack thread at the proper moments. The traversing-carriage D, before referred to, forms one of the most important features of my invention, as by it the whole course of the work beneath the needles, both laterally and longitudinally, and, consequently, the pattern to be formed by the stitches, is determined. This carriage extends entirely around the flanged bars B and B' of the frame, and consists of vertical side bars or plates $o$ $o$, arranged outside of the bars B B', and connected together above and below the latter by transverse rods $o^1$ $o^2$, to the uppermost of which are hung rollers $p$ $p$, which run upon the flanges of the bars B B', and while supporting the carriage enable it to be moved readily from side to side across the bed of the machine. (See Figs. 5 and 6.) Two rollers, $p^1$ $p^1$, attached to adjustable hangers of the rod $o^1$, run upon the inner edges of the bars B B', and prevent the carriage from slipping from its position upon the frame. From the side plates $o$ $o$ of the carriage project brackets $p^2$, to which, at one end of the machine, are hung three geared feeding-rollers, J, $J^1$, and $J^2$, and at the opposite end of the machine three similar geared take-up rollers, K, $K^1$, and $K^2$, the journals of the uppermost roller of each set being acted upon by weighted levers $p^3$, which, while holding the said rollers downward against those beneath, enable them to yield to a sufficient extent to adapt themselves to inequalities in the thickness of the work passing between them and the said under rollers, Figs. 1 and 3. At one end of the machine proper, adjacent to the feeding-rollers J, $J^1$, and $J^2$, is a supplemental frame or feeder for supplying the materials of which the quilts are to be made. This consists of a frame, L, Fig. 1, supporting a large box or receptacle, M, to be filled with a supply of shoddy or cotton wadding, and supporting also two rollers, N and N', upon which are wound calico or other fabric. The receptacle M has a perforated or gauge-bottom, a hinged door, $q$, for the introduction of the wadding, and a sliding door, $q^1$, on the side adjacent to the feeding-rollers, arranged to be raised and lowered by a set-screw, $q^2$. The said receptacle has also a revolving beater, P, for forcing the wadding through the outlet opening and into the converging space between the two thicknesses of fabric, one of the latter passing over the bottom of the receptacle, and the other around a roller, $q^4$, and both with the wadding passing between the feeding-rollers J, $J^1$, and $J^2$. The roller $q^4$ is hung to the sliding door $q^1$, and can be raised and lowered with the latter for the purpose of regulating the size of the converging space into which the wadding is to be introduced, and consequently of determining the thickness of the filling. The combined fabric and wadding, marked X in the drawing, is drawn across the machine in the direction of the arrow 1, Figs. 1, 3, and 5, by an intermittent motion imparted to the lower drawing roller $K^1$, by any suitable friction-clutch, Q, deriving its movement from a cam, $r$, on the driving-shaft G, through the medium of a spring-lever, $r'$. (See Fig. 5.) This friction-gear is of such a character as to turn the roller $K^1$ in one direction only, as indicated by the arrow 2, it being turned by the outward movement of the lever, and being held stationary when the said lever is drawn inward by its spring against the narrow portion of the cam. I prefer this friction-gear, or its equivalent, to the usual pawl and ratchet for imparting an intermittent rotary motion in one direction. A reciprocating motion across the frame of the machine can be imparted to the carriage D by a cam, $s$, on a short transverse shaft, G', connected by bevel-gear with the driving-shaft G. (See Figs. 6 and 7.) The cam $s$ acts upon a spring-lever, $s^1$, which controls a friction-clutch, $s^2$, the latter imparting a slow intermittent movement in the direction of the arrow, 3, Fig. 7, to a pulley, $s^3$, hung to a spindle, $s^4$, which has its bearings in brackets $s^5$, secured to the fixed frame of the machine. On the spindle $s^4$ there is a heart-shaped cam, $t$, which acts upon rollers $t^1$ $t^1$ of a lever, R, hung to the fixed frame, and imparts a vibrating motion to the said lever, which motion is transmitted to the carriage D by a rod, $t^2$, connected to the upper end of the lever and to one of the rods $o^1$ of the carriage. (See Figs. 7 and 7½.)

In order that the machine may be fully understood, I will first proceed to describe the simplest method of operating it—that is, for forming straight rows of stitches, as indicated by the dotted lines $z$ in Fig. 2. The shaft $G'$ is thrown out of gear with the driving-shaft in order that the carriage D may remain stationary. The calico or other fabric from the rollers N and $N^1$ is drawn tightly across the machine and passed between the two sets of rollers J and K, and the receptacle M is filled with loose shoddy or other material with which it is desired to fill the quilts. The machine is then set in motion, the driving-shaft and beater P turning in the direction of their respective arrows, Fig. 1, and the latter feeding the filling material uniformly into the converging space between the two thicknesses of fabric. The door $q^1$ and roller $q^4$ can, as before mentioned, be raised or lowered so as to determine the size of the outlet-opening, and thus regulate the quantity of wadding fed into the converging space between the two thicknesses of fabric, the beater P, as it revolves, throwing the surplus material back into the receptacle, and serving also to cleanse the material by beating the dust out of the same through the lower thickness of calico and through the perforations in the bottom of the receptacle. The work prepared for the needles, as above described, is carried forward to the same at regular intervals by the motion imparted to the roller $K^1$ from the cam $r$ on the driving-shaft through the medium of the spring-lever $r'$ and friction-clutch Q. As the work is thus fed to the needles the latter are operated simultaneously and in proper time in respect to the shuttles by the rock-shafts H, $H^1$, and $H^2$, and the devices described, the machines forming what is known as the ordinary lock-stitch, and the needles penetrating both thicknesses of fabric and the filling, so as to quilt or bind the whole tightly together by straight and parallel rows of stitches $z$, as indicated by the dotted lines in Fig. 2. The sewed material, as it passes from the machine, may be wound upon a roller or rollers, or be cut at once into suitable lengths for quilts, which can be afterward bound at the edges by hand or by the aid of an ordinary sewing-machine. As the needles are caused to penetrate the material, and the shuttles to pass through the loops of needle-thread by the action of the springs $d\ d$, Fig. 4, instead of by a direct pressure from the cams $b$, $b^1$, and $b^2$, the said needles and shuttles can yield, in case of meeting with an obstruction, to a sufficient extent to prevent any breakage or injury of the parts, or the whole of the needles can be lifted, or the shuttles drawn back after stopping the machine, in case stitches are dropped or other accidents occur. This, it will be evident, could not be done if cams or any other positive mechanism were relied on. The tension-levers $n$, operated by the rock-shaft I, descend as the needle-bars commence to rise to form the loop, and continue to descend as the needle-bars make a second partial descent before finally rising, and the said tension-levers are then lifted with the needle-bars. The result of these several movements is that the thread is slackened sufficiently to form a loop for the passage of the shuttle, and that the cutting of the thread by the nose of the shuttle and the tangling of the same after the passage of the latter are prevented. This tension device, however, is applicable to sewing-machines generally, and forms the subject of a separate application for a patent. It will not be necessary, therefore, to describe it more minutely here.

I will now proceed to describe the operation of the traversing-carriage D in respect to the fixed sewing-machines. If the shaft $G'$ be thrown into gear with the driving-shaft, and the machine be set in motion, the cam $r$ and the devices connected therewith will act uniformly and regularly upon the drawing rollers K, and feed the work to the needles uniformly and at regular intervals, as before described, and the cam $s$ will, in like manner, and at the same time, through the medium of the carriage D, carry the work transversely beneath the needles, first in one direction and then in the other, the result being that zigzag instead of straight rows of stitches will be formed upon the quilt. This result could be attained with a single row of needles; but by the use of the double row of needles $x$ and $x'$, arranged as before described, patterns of a much more intricate character, such, for instance, as those illustrated by the dotted lines in Fig. 6, can be produced. To produce the diamond pattern shown in the upper part of Fig. 6, there must be a combined lateral and longitudinal feeding of the work, so that each needle shall form a zigzag row of stitches, and these zigzag rows must meet each other at the angles, so as to produce the desired diamond-shaped pattern upon the quilt. To accomplish this, the feeding must be so regulated that each of the rear needles $x$ shall, before the motion of the carriage D is received, bring its row of stitches quite up to the point at which the sewing was commenced by the adjacent outer needle $x'$. This operation will be readily understood if it be borne in mind that the entire number of zigzag rows of stitches should, in the upper part of Fig. 6, have been made by the needles marked 1, 2, 3, and 4, respectively, and that the row of stitches between the straight lines 5 and 6 has been formed by the needle 1, the row between the lines 6 and 7 by the needle 2, &c. The inclined arrow in Fig. 6 indicates the direction of the feeding of the work to continue the row of stitches. To produce the peculiar pattern shown in the lower part of Fig. 6 the work must also be fed both laterally and longitudinally; but as curved instead of straight rows of stitches have in this case to be formed, the feeding, it will be evident, must be differential, the lateral feed predominating at one point, and the longitudinal feed at another. This result is attained by a very simple arrangement of pattern-bars, which regulate the action of the cams $r$ and $s$ upon the spring-levers $r'$ and $s^1$, and, consequently, the extent of the movement of the friction-clutches Q and $s^2$, Figs. 5 and 7, and the longitudinal and lateral feeding of the work by the drawing-rollers K and carriage D.

The extent of the action of the cam $r$ upon the spring-lever $r'$ is determined by a simple inclined bar, T, rigidly secured to the end frame $A^1$ of the fixed frame, but capable of adjustment upon the same. (See Figs. 5 and 6.) This pattern-bar is set at such an angle in respect to the lever $r'$ that as the latter is moved laterally with the carriage D in the direction of the arrow 7, Fig. 6, it will be gradually moved outward from the cam $r$, so that when the carriage reaches the limit of its movement in the direction of the arrow 7 the outward throw of the cam $r$ will move the lever to but a very slight extent, the longitudinal feeding of the work by the rollers K being, consequently, limited also, as their movement depends upon that of the said lever $r'$. On the reverse movement of the carriage D in the direction of the arrow 8 the lever $r'$ will be permitted by the pattern-bar to be brought more and more within the control of the cam, the movement of the said lever, and consequently the longitudinal feeding of the work, being greatest when the carriage D has completed its movement in the direction of the arrow 8.

The extent of the movement of the carriage D, and consequently that of the lateral feeding of the work, is determined by a nearly similar arrangement of devices, except that in this case the pattern-bar U, Figs. 7 and 8, instead of the lever $s^1$, has a sliding movement imparted to it, while the said lever is hung to the fixed frame. The pattern-bar is inclined in respect to the lever $s^1$, and acts upon the latter in the same manner as does the bar T upon the lever $r'$. It is secured to a block, $u$, arranged to slide upon guides $u'$ in a direction at right angles to the movement of the carriage, and it receives its motion from the latter through the medium of a slotted bell-crank lever, $w$, hung to the bar C of the fixed frame, and connected to the block $u$ and to the cross-piece $o^1$ of the carriage. The movement of the carriage in the direction of the arrow 9, Fig. 8, will have the effect of moving the pattern-bar U in the direction of its arrow, and of consequently throwing the lever $s^1$ outward from the cam $s$, so as to limit the action of the same upon the said lever, and consequently limiting the movement of the carriage and the extent of the lateral feeding of the work, the rapidity of the movement of the carriage being least when it has moved to its full extent in the direction of the arrow. On reversing the movement of the carriage the movement of the inclined pattern-bar will also be reversed, and the lever $s^1$ will gradually be brought more and more under the control of the cam $s^1$, and the rapidity of the movement of the carriage and the extent of the lateral feed will be increased in the same ratio. With a double row of needles and the differential feeding of the work, determined, as above described, by means of the pattern-bars, it will be evident that such a pattern as that illustrated in the lower part of Fig. 6 can be readily produced. To produce this pattern it is mainly essential that the pattern-bars should be so arranged in respect to each other that the lateral feed should predominate at the outset, and constantly decrease, while the longitudinal feed constantly increases, this producing one-half of the curve—that, for instance, marked 9 in the drawing—while to produce the remaining half of the curve shown at 10 must be a constant decrease of the longitudinal feed, and corresponding increase of the lateral feed. The work, in other words, must be fed to the needles on curved lines corresponding to the desired curves of the rows of stitches.

By changing the angles of the pattern-bars a variety of patterns can be produced, and by using curved instead of straight pattern-bars waved lines of stitches of various characters can be formed. (See Fig. 6.)

Another feature of my invention is the arrangement of the shuttles for the sewing-machines with their carriers and carrier-guides. These parts, as before described, are complete and independent for each sewing-machine, and are secured to the flanged bars B B' of the fixed frame by clamping-blocks $j^1$ and $j^2$, Figs. 3, 9, 10, and 11. This enables the whole to be readily detached at any time without interfering with the corresponding parts of the other sewing-machines, and also enables the machines to be adjusted toward or from each other upon the bars B B' and C, for the purpose of regulating the distances between the rows of stitches, the frames $e$ of the upper parts of the sewing-machines being also made adjustable for this purpose, as before described.

In quilting-machines as heretofore constructed the shuttles have been arranged to slide in a race, from which they could only be removed from the top after lifting up the work. This lifting up of the work and withdrawing of the shuttle from the top of the race involved a considerable loss of time, and was very inconvenient, especially when the shuttle to be removed or replaced was beneath the center of the quilt.

To overcome this objection I have dispensed with the race altogether, and substituted a carrier, $i$, for the same, as before described, the shuttle-holding lever $l$ on the carrier enabling the shuttle to be turned downward and readily removed from beneath the machine without requiring any lifting up of the work.

Another objection to the ordinary race was the difficulty of overcoming the effects of wear. When the carrier $i$, however, begins to work loosely upon its guiding-rods $j.j$, the latter can be readily removed and replaced at a very slight cost by others of a larger diameter.

I claim—

1. In a quilting-machine, a reservoir for holding shoddy or other filling and rotating beaters, or their equivalents, for introducing the filling from the reservoir between two fabrics where they converge to the feed-rolls.

2. The combination of the rotating beater P within the reservoir M with the adjustable door $q^1$ of the latter and its roller $q^4$, the whole being arranged substantially as described, for the purpose of regulating the supply of shoddy or other filling into the converging space between the two fabrics.

3. In combination with the double row of needles, arranged substantially as described, the carriage and feed-rollers, and the devices described, or their equivalents, for imparting differential movements to the rollers and carriage, for the purpose set forth.

4. The combination, with the feed-levers and with cams for operating the same, of pattern-bars, arranged and operating substantially as specified.

5. The combination and arrangement, substantially as herein described, of the elongated cam $r$ on the driving-shaft, the pattern-bar T secured to the fixed frame, and the feed-lever $r'$ hung to the traversing-carriage D.

6. The combination and arrangement, substantially as described, of the sliding pattern-bar U, deriving its movement from the carriage D, and the feed-lever $s^1$ and the cam $s$ hung to the fixed frame.

7. The combination and arrangement, substantially as described, of the feed-lever $s^1$, friction-gear $s^2$, spindle $s^4$, heart-cam $t$, lever R, and rod $t^2$, for connecting the latter to the carriage D.

8. The combination of a series of needles, arranged in two rows, one behind and alternating with the other, and devices for feeding the work beneath the needles, substantially as described.

9. The combination of the bar H or $H^1$, operating a series of needle-arms, the bar $H^2$ operating a series of shuttles and springs or cams or their equivalents, whereby the needle-arms are depressed and the shuttles moved forward by the action of the springs, as and for the purpose set forth.

10. The carrier sliding on a guiding-rod or rods, and having a projection, $h$, in combination with the adjustable lever $l$, and with the spring $m$ or equivalent device for retaining the lever after adjustment.

In testimony whereof I have signed my name to this specification in the presence of two subscribing witnesses.

WM. J. TATE.

Witnesses:
WM. A. STEEL,
HARRY SMITH.